(12) United States Patent
Ikeda et al.

(10) Patent No.: US 7,704,473 B2
(45) Date of Patent: Apr. 27, 2010

(54) METHOD AND DEVICE FOR CONTROLLING EXHAUST EMISSION FROM INTERNAL COMBUSTION ENGINE

(75) Inventors: Masanori Ikeda, Himeji (JP); Atsushi Fukumoto, Kobe (JP)

(73) Assignees: ICT Co., Ltd., Osaka-Shi, Osaka (JP); International Catalyst Technology, Inc., Auburn Hills, MI (US)

( * ) Notice: Subject to any disclaimer, the term of this patent is extended or adjusted under 35 U.S.C. 154(b) by 350 days.

(21) Appl. No.: 11/665,745

(22) PCT Filed: Oct. 5, 2005

(86) PCT No.: PCT/JP2005/018447

§ 371 (c)(1),
(2), (4) Date: Apr. 19, 2007

(87) PCT Pub. No.: WO2006/046389

PCT Pub. Date: May 4, 2006

(65) Prior Publication Data

US 2009/0056318 A1 Mar. 5, 2009

(30) Foreign Application Priority Data

Oct. 26, 2004 (JP) ............................... 2004-310568

(51) Int. Cl.
B01D 37/00 (2006.01)
B01D 53/92 (2006.01)
B01D 53/94 (2006.01)
F01N 3/10 (2006.01)
F01N 3/36 (2006.01)

(52) U.S. Cl. ............... 423/213.2; 423/213.5; 423/213.7; 423/215.5; 422/168; 422/169; 422/172; 422/177; 422/182; 422/183; 60/274; 60/282; 60/295; 60/299; 60/303

(58) Field of Classification Search .............. 423/213.2, 423/213.5, 213.7, 215.5; 422/168, 169, 172, 422/177, 178, 182, 183; 60/274, 285, 295, 60/299, 303

See application file for complete search history.

(56) References Cited

U.S. PATENT DOCUMENTS

| | | | | |
|---|---|---|---|---|
| 4,372,111 | A * | 2/1983 | Virk et al. ................. | 60/274 |
| 4,522,027 | A * | 6/1985 | Hasegawa et al. ............ | 60/274 |
| 5,100,632 | A |  3/1992 | Dettling et al. | |
| 5,207,990 | A * | 5/1993 | Sekiya et al. ............... | 422/183 |
| 6,622,480 | B2 * | 9/2003 | Tashiro et al. .............. | 60/295 |
| 6,895,745 | B2 * | 5/2005 | Roby ...................... | 60/280 |
| 6,952,918 | B2 * | 10/2005 | Imai et al. ................. | 60/295 |
| 7,021,047 | B2 * | 4/2006 | Hilden et al. ............... | 60/286 |
| 7,076,944 | B2 |  7/2006 | Okugawa et al. | |
| 7,243,491 | B2 * | 7/2007 | Okugawa et al. ............ | 60/311 |
| 7,367,182 | B2 * | 5/2008 | Takahashi et al. ........... | 60/286 |
| 7,478,528 | B2 * | 1/2009 | Ament et al. ............... | 60/295 |
| 2003/0230076 | A1 | 12/2003 | Kwon | |
| 2004/0047774 | A1 | 3/2004 | Suwabe et al. | |
| 2004/0055287 | A1 | 3/2004 | Sato et al. | |
| 2004/0120865 | A1 | 6/2004 | Yamamoto et al. | |
| 2004/0187477 | A1 | 9/2004 | Okugawa et al. | |
| 2005/0095188 | A1 | 5/2005 | Matsumoto et al. | |

FOREIGN PATENT DOCUMENTS

| | | |
|---|---|---|
| EP | 1387071 A | 2/2004 |
| JP | 60-043113 A | 3/1985 |
| JP | 5-044435 A | 2/1993 |
| JP | 9-228823 A | 9/1997 |
| JP | 2002-089247 A | 3/2002 |
| JP | 2004-019651 A | 1/2004 |
| JP | A-2004-060582 | 2/2004 |
| JP | 2004-108207 A | 4/2004 |
| JP | 2004-150389 | 5/2004 |
| JP | A-2004-251266 | 9/2004 |
| JP | 2004-301013 A | 10/2004 |
| KP | 0363138 | 11/2002 |
| KP | 2003-0096939 | 12/2003 |
| KP | 2004-0084637 | 10/2004 |
| WO | 03/068394 A1 | 8/2003 |

OTHER PUBLICATIONS

Notification of Reasons for Refusal in JP 2004-310568 dated Feb. 3, 2009, and an English Translation thereof.

(Continued)

*Primary Examiner*—Timothy C Vanoy
(74) *Attorney, Agent, or Firm*—Buchanan Ingersoll & Rooney PC

(57) ABSTRACT

A purification method excellent in removing particulates or the like from exhaust gas from an internal combustion engine, in particular, a diesel engine or the like. The purification method uses an exhaust gas purification apparatus including an oxidation zone installed with an oxidation catalyst supporting both platinum and palladium, and a filtering zone installed with a particulate filter, along exhaust gas flow at the exhaust gas passage of an internal combustion engine. Hydrocarbon-based liquid is supplied to the inflow side of the exhaust gas of the oxidation zone at the time when 2 to 10 g of particulates per 1 liter of the particulate filter are caught, to raise temperature of the exhaust gas up to equal to or higher than 550° C. by the oxidation catalyst so as to make the residue of the particulate filter combusted.

8 Claims, 1 Drawing Sheet

OTHER PUBLICATIONS

International Search Report dated Jan. 17, 2006 (with English translation of category of cited documents).
Written Opinion of the International Searching Authority dated Jan. 6, 2006.
Patent Office Argument Submittal issued in corresponding Korean Patent Application No. 10-2007-7007822, and translation thereof.
FormPCT/ISA/237 (Written Opinion of the International Searching Authority) dated Jan. 6, 2006.
Official Decision for Rejection dated Aug. 7, 2009 issued in corresponding Japanese Patent Application No. 2004-310568, with an English language translation thereof.
Official Action issued Aug. 21, 2009 in corresponding Chinese Patent Application No. 2005-800366163, and English language translation thereof.
Supplementary European Search Report dated Oct. 7, 2009 issued in corresponding European Patent Application No. 05 79 0571.

* cited by examiner

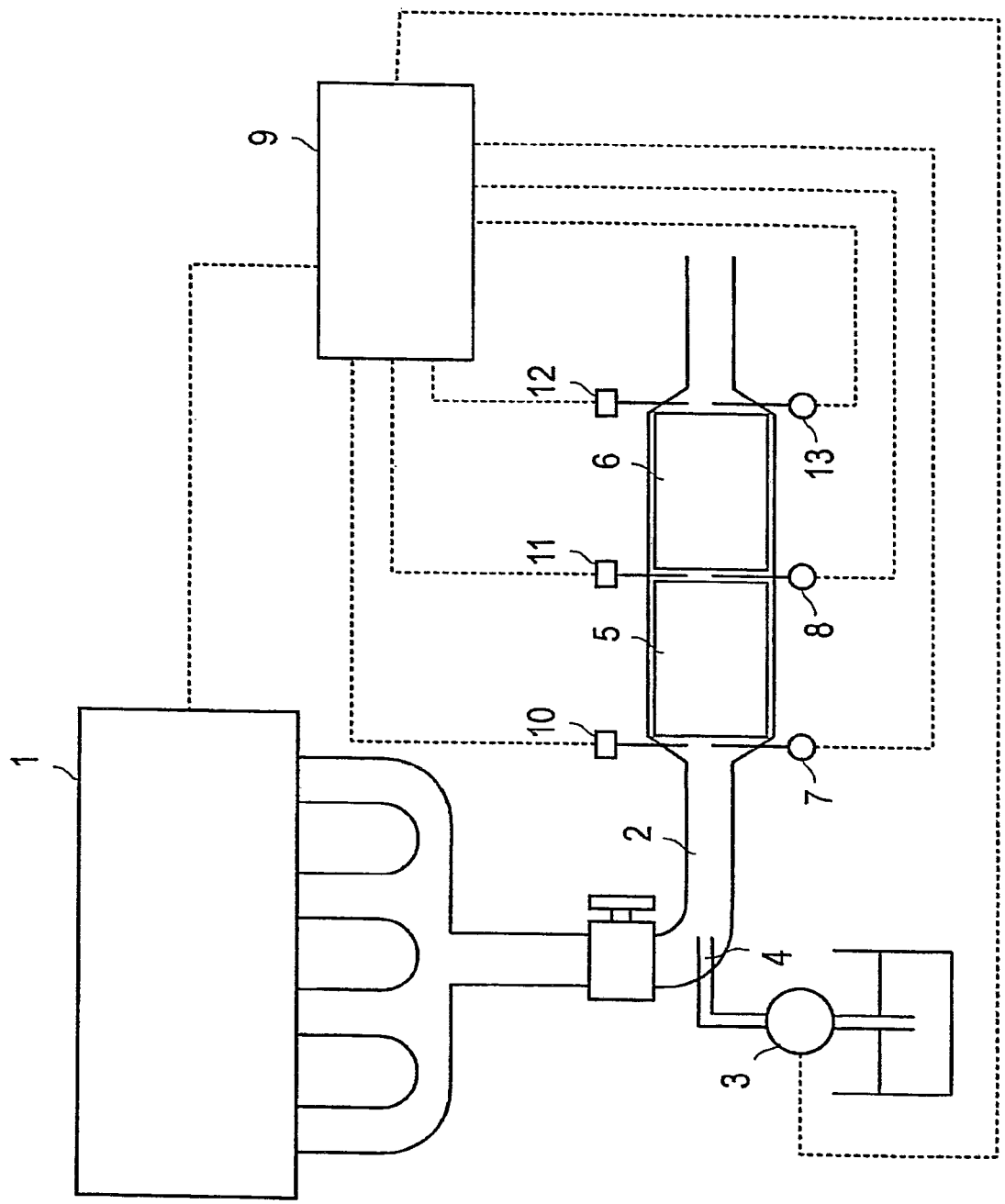

METHOD AND DEVICE FOR CONTROLLING EXHAUST EMISSION FROM INTERNAL COMBUSTION ENGINE

TECHNICAL FIELD

The present invention relates to a purification method and a device for exhaust gas which emitted from an internal combustion engine. If we go into detail, the present invention relates to an excellent purification method for harmful component like particulates in the exhaust gas emission from internal combustion engine, in particular, a diesel engine.

BACKGROUND ART

A diesel particulate filter is used to catch PM (particulate matter) containing dark smoke or SOF (soluble organic fraction) exhausted from an internal combustion engine such as a diesel engine or the like. However, accumulated PM causes an increase of pressure in the filter.

Therefore, to prevent an increase of pressure, a heating unit such as an electric heater is equipped around the filter to combust and remove PM so as to regenerate the filter.

Such a conventional purification apparatus for exhausted gas, however, required to switch a filter to another one while the regeneration of the filter is carried out. Every time when a certain amount of PM is deposited, it is necessary to switch between at least 2 filters to repeat catching and regeneration. Regeneration of a filter requires heating inside of the filter up to combustion temperature of PM; which in turn requires installment of a heating apparatus such as an electric heater or the like. To solve such a problem, a purification system has been proposed, where hydrocarbon adsorption zone supported zeolite, and a PM filtering zone supported an oxidation catalyst are installed at an exhaustion passage of an internal combustion engine, and as the oxidation catalyst, platinum, palladium, rhodium, cerium, copper, vanadium, iron, silver or the like is disclosed (JP-A-2002-89247).

In addition, a purification apparatus for exhaust gas from a diesel engine equipped with a filter for catching particulates from a diesel engine, a catalyst converter with high activity for injected hydrocarbon (HC) installed at the upstream for the filter, and a HC control unit which is capable of supplying a large amount of HC to the catalyst converter has been proposed (JP-A-60-43113).

Furthermore, a filter for particulates exhausted from a diesel engine, coated with a catalyst component thereon has also been proposed (U.S. Pat. No. 5,100,632A). In addition, a purification apparatus for exhaust gas from a diesel engine installed a filter which supported an oxidation catalyst at downstream of a turbo charger has been proposed. This filter catches fine particles and a fuel supplying unit to generate heat by exothermic reaction between oxygen and fuel using the oxidation catalyst has also been proposed (JP-A-05-44435). In addition, a purification system for exhaust gas from an internal combustion engine which is equipped with a diesel particulates filter of continuous regeneration type at the exhaust gas passage of the engine is proposed. In this system, accumulated particulate material is removed by regeneration mode operation, at the timing when an amount of the accumulated particulate material in the filter is equal to or more than a specified discrimination value. Furthermore, in this system, a purification system which is equipped with an estimation unit to estimate an amount of accumulated particulate material into the filter, and a control unit for limiting the maximal injection amount of fuel to an internal combustion engine, at the timing when amount of particulate material is equal to or more than a specified discrimination value, has also been proposed (JP-A-2004-108207).

DISCLOSURE OF THE INVENTION

Problem to be Solved by the Invention

Any of the methods according to the above literatures has high accumulation ratio of PM. However, these methods are incurred an increase of pressure in the filter caused by accumulation of PM, which results in engine stop. To avoid this problem, it requires to carry out regeneration processing of the filter, before occurrence of engine stop and reduction of engine power. As regeneration processing of a filter with temperature equal to or higher than needed for combustion of accumulated PM. There is a method for supplying hydrocarbon from the upstream of an oxidation catalyst to generate heat for regeneration of the filter by a combustion reaction of hydrocarbon on the oxidation catalyst. In this method, it is required to supply heat to a filter with temperature equal to or higher than needed for combustion of accumulated PM as regeneration processing of a filter. There is a combusting method for high concentration of hydrocarbon by oxidation catalyst. By this method, it is possible to supply heat to a diesel particulate filter with temperature equal to or higher than needed for combustion of PM. However, this method for combusting such high concentration hydrocarbon requires high thermal durability due to exposure to high temperature exhaust gas heated by combustion reaction. Most of conventional oxidation catalysts for filter regeneration, however, are composed of platinum, as a major component, which were thus insufficient in thermal durability in a supply system of high concentration hydrocarbon-based liquid fuel. In such a purification system, there was a problem which regeneration of a filter was not sufficient after a long period of use.

In addition, in the case where temperature of exhaust gas in supplying fuel is equal to or lower than boiling point of hydrocarbon to be supplied, hydrocarbon results in to be supplied as a liquid state to an oxidation catalyst, which causes a problem of generation of hydrocarbon adhesion. In a diesel engine, frequency of low temperature of exhaust gas is high as compared with a gasoline engine and that means hydrocarbon adhesion is easy to occur in diesel. There is a big advantage if temperature at which fuel can be supplied is low, because the temperature range at filter can be regenerated is widen. It is required to carry out a combustion reaction of hydrocarbon on an oxidation catalyst by supplying hydrocarbon at low temperature such as urban driving. However, platinum-based catalyst tends to make easy adherence of carbon-containing components such as hydrocarbon onto a catalyst component, and this adherence of carbon-containing components such as hydrocarbon onto a catalyst component. This adherence inhibits a combustion reaction. As a result of this, regeneration of a filter is not occurred sufficiently, even when hydrocarbon for filter regeneration is supplied.

Therefore, it is an object of the present invention to provide a novel purification method for exhaust gas from an internal combustion engine, and an apparatus thereof.

It is another object of the present invention to provide a purification method excellent also in removing particulates and the like from exhaust gas from an internal combustion engine, in particular, a diesel engine, and an apparatus thereof.

It is still another object of the present invention to provide a purification method for exhaust gas from an internal combustion engine, which is a system for supplying high concentration hydrocarbon-based fuel, and is thus capable of regenerating a filter stably for a long term, and an apparatus thereof.

Means for Solving the Problem

The above objectives can be attained by the following aspects (1) to (8):

(1) A purification method for exhaust gas from an internal combustion engine using an exhaust gas purification apparatus including an oxidation zone installed with an oxidation catalyst supported by both platinum and palladium, and a filtering zone installed with a particulate filter, along exhaust gas flow at the exhaust gas passage of an internal combustion engine, characterized in that hydrocarbon-based liquid is supplied to the inflow side of the exhaust gas of the oxidation zone at the time when 2 to 10 g of particulates per 1 litter of the particulate filter are caught, to raise temperature of the exhaust gas up to equal to or higher than 550° C. by the oxidation catalyst so as to make the residue of the particulate filter combusted.

(2) The method according to the above (1), wherein the oxidation catalyst is refractory inorganic oxide powders containing platinum and palladium, coated on 3-dimensional refractory structure, and mass ratio of platinum/palladium is 20/1 to 1/1.

(3) The method according to the above (1) or (2), wherein the refractory inorganic oxide is at least one kind selected from the group consisting of alumina, silica-containing alumina, zirconia and titania.

(4) The method according to any one of the above (1) to (3), wherein the oxidation catalyst is one capable of raising temperature of the residue of the particulate filter to as high as equal to or higher than 550° C. and combusting, by supplying of the hydrocarbon-based liquid, even when it is exposed to a high temperature of equal to or higher than 800° C.

(5) The method according to any one of the above (1) to (4), wherein the internal combustion engine is a diesel engine.

(6) A purification apparatus for exhaust gas from an internal combustion engine, including an oxidation zone installed with an oxidation catalyst supporting both platinum and palladium, and a filtering zone installed with a particulate filter, along exhaust gas flow at the exhaust gas passage of an internal combustion engine, and installed with a liquid supply port of hydrocarbon liquid, so that hydrocarbon-based liquid is supplied to the inflow side of the exhaust gas of the oxidation zone at the time when 2 to 10 g of particulates per 1 litter of the particulate filter are captured to raise temperature of the exhaust gas up to equal to or higher than 550° C. by the oxidation catalyst so as to make the residue of the particulate filter combusted.

(7) The apparatus according to the above (6), wherein the oxidation catalyst is refractory inorganic oxide powders containing platinum and palladium, coated on 3-dimensional refractory structure, and mass ration of platinum/palladium is 20/1 to 1/1.

(8) The apparatus according to the above (6) or (7), wherein the internal combustion engine is a diesel engine.

ADVANTAGES OF THE INVENTION

The present invention is one having the above composition, and using a catalyst containing both platinum and palladium, as an oxidation catalyst, therefore, a system for supplying high concentration hydrocarbon-based fuel, which is thus capable of filter regeneration stably for a long period; in particular, by presence of both platinum and palladium in suitable ratio, effect thereof becomes excellent. In addition, this effect makes to occur difficult adherence of carbon-containing components such as hydrocarbons, and enables a stable combustion reaction, and enables filter

BRIEF DESCRIPTION OF DRAWING

The drawing is a schematic view showing outline of a purification apparatus for exhaust regeneration stably for a long period.

BEST MODE FOR CARRYING OUT THE INVENTION

Now, the present invention will be explained in further detail with reference to the drawing. Namely, the drawing shows a schematic view of a purification apparatus for exhaust gas from an internal combustion engine, according to the present invention.

Namely, the exhaustion piping 2 communicated with the internal combustion engine 1, in particular, a diesel engine, is installed with, by further communicated with, the oxidation zone 5 filled with an oxidation catalyst, and communicated with the downstream side thereof, the filtering zone 6 filled with a particulate filter. In addition, at the exhaustion piping 2 at the inflow side of the exhaust gas from the oxidation zone 5, the fuel supply nozzle 4 installed with a check valve (not shown), if necessary, and the fuel supply nozzle 4 connected with the nozzle 4 are provided, as a unit for supplying hydrocarbon-based liquid fuel for raising temperature.

The purification apparatus for exhaust gas, with such a configuration, is installed with each of the temperature sensor 7 and the pressure sensor 10 at the catalyst entrance part, and also each of the temperature sensor 8 and the pressure sensor 11, at the output part, and further, if necessary, each of the temperature sensor 13 and the pressure sensor 12, at the exit of the filtering zone 6 equipped with a filter, so as to measure temperature and pressure at the entrance part and exit part of the catalyst, if necessary. In addition, a signal of each of the temperature sensor and the pressure sensor is connected so as to enter the controller 9, and the signal of the controller 9 is also connected so as to enter a pump.

In addition, as the other embodiment of the present invention, direct supply may also be adopted to the internal combustion engine 1, for example, a cylinder of a diesel engine, by the signal of the controller 9, without installment of the pump 3 and the fuel supply nozzle 4. For example, hydrocarbon-based liquid (for example, fuel) may also be supplied after completion of fuel combustion in a cylinder of an internal combustion engine, or before completion of the exhaustion step.

Next, action of the purification apparatus for exhaust gas, with such a configuration, will be described. Namely, as shown in the drawing, non-combustion hydrocarbon (HC) or carbon monoxide (CO) generated, contained in the exhaust gas from an internal combustion engine 1, for example, a diesel engine, passes through the exhaustion piping 2, and is converted to water or carbon dioxide by nearly complete oxidization in the oxidation zone 5 filled with an oxidizing catalyst, and exhausted outside the system through the filtering zone 6 filled with a filter, and a muffler (not shown) or the like.

On the other hand, particulates contained in exhaust gas are caught by the particulate filter at the external filter zone 6, however, because of gradual accumulation thereof, hydrocarbon-based liquid (fuel) is injected from the nozzle 4 so as to be supplied onto the oxidizing catalyst 5 in the oxidation zone 5, at the timing when the accumulated amount thereof increases up to 2 to 10 g per 1 L of the filter.

There are various methods for detecting adhered amount of particulates on a filter, however, for example, as shown in the drawing, it is measured by the pressure sensors 10, 11, and 12; measurement signals thereof are sent to the controller 9, and by the command thereof, the fuel supply pump 3 is actuated so as to inject hydrocarbon-based liquid. In particular, the pressure sensor 11, which is installed between the oxidation zone 5 and the filtering zone 6, is set to measure pressure at the filtering zone 6, so as to actuate the fuel supply pump 3 by the command of the controller 9 in accordance with a value received, when the measured value becomes equal to or higher than a specified pressure, or to stop the operation of the pump 3 by the command of the controller 9, when the pressure becomes equal to or lower than a specified pressure.

In the case where abnormality is found in the temperature sensor 13 at the exit of the filtering zone 6, for example, in the case of a temperature over 700° C., the operation of the fuel supply pump 3 is stopped by the command of the controller 9, or in the case of a temperature below 180° C., because fuel components present as hydrocarbon-based liquid is in a large quantity, the operation of the pump is stopped. The temperature sensor 8 at the exit of the oxidation zone 5 is set to measure temperature at the oxidation zone 5; in the case where abnormality is found in the temperature, for example, a temperature over 700° C., because of being in a dangerous state, the operation of the pump is stopped by the command of the controller, or supply amount of hydrocarbon-based liquid is reduced. On the other hand, when the temperature is below 500° C., supply amount of hydrocarbon-based liquid is further increased. The temperature sensor 7 at the entrance of the oxidation zone 5 is set to measure temperature of exhaust gas from the internal combustion engine; in the case where problem is found in the temperature, fuel supply amount by the pump 3 is increased or decreased by the command of the controller 9. For example, in the case of light oil, it is 330° C. that 90% or more components thereof become boiling point or higher, and thus at the temperature not over 330° C., high-boiling fractions of light oil are introduced in a liquid state into the oxidation zone 5, which delays combustion reaction rate on the catalyst, and the light oil is supplied by small portions by the pump 3 in accordance with the command of the controller 9.

A pressure sensor at the entrance of the oxidation zone 5 is set to detect clogging at the oxidation zone 5, or abnormality such as fracture of a carrier or the like; in the case where abnormality generates, fuel supply is set to be stopped. In addition, a pressure sensor at the exit of the filtering zone 6 is set to detect abnormality inside the exhaustion piping at the rear part of the filtering zone 6, or measure pressure on the filter in the filtering zone 6, based on difference between the pressure sensor 11 and the pressure sensor 12.

The control unit 9, in general, sends a fuel supply signal to a fuel injection apparatus, so as to initiate filter regeneration control (fuel supply), when information on temperature and pressure before and after the filter (or inside the filter), which is sent to the control unit after measurement of pressure on the filter, is over a certain value. Pressure value on the filter is sent by the pressure sensor to the control unit, even during fuel supply, and at the timing when the pressure value is decreased down to a certain value, regeneration control is stopped.

In addition, similar procedure is taken, also in the case where hydrocarbon-based liquid (fuel) is directly supplied to an internal combustion engine.

An oxidation catalyst used in the present invention is one prepared by supporting catalyst components composed of both platinum and palladium on refractory inorganic oxide powders, and then the refractory inorganic oxide powders which support the catalyst components are coated on 3-dimensional refractory structure.

The essential catalyst components used in the present invention are platinum and palladium. Morphology of these noble metals is not especially limited, as long as having catalytic activity, usually however, morphology of metallic platinum, platinum black or oxide can be exemplified. Use amount of the noble metal is usually 1 to 10 g, preferably 2 to 5 g per 1 litter of one-piece structure. The use amount below 1 g provides insufficient catalytic activity at the initial and after a long term of service; while, the use amount over 10 g does not provide catalytic activity in proportion to the use amount, and thus not preferable. Here, "use amount of catalyst components like a noble metal per 1 litter of one-piece structure" represents a value based on apparent volume of the 3-dimensional structure like a honeycomb carrier to be used.

Mass ratio of platinum/palladium in the noble metal is 20/1 to 1/1, preferably 5/1 to 2/1. Starting material of platinum includes inorganic compounds such as platinum nitrate, dinitroammine platinum, platinic chloride; organic compound like bisplatinum. In addition, starting material of rhodium includes rhodium nitrate, rhodium chloride, rhodium acetate or the like.

These noble metals may form slurry by formulation of solutions thereof at the same time into the refractory inorganic oxide powders, or may be supported onto the 3-dimensional structure by separate formation of slurry.

Components of the refractory inorganic oxide powders used in the present invention may be any one as long as usually used as catalyst carriers, and for example, activated alumina such as α-alumina or γ-, δ-, η-, θ-alumina; titania or zirconia, titania, silicon oxide or a composite oxide thereof, for example, alumina-titania, alumina-zirconia, titania-zirconia; or the like may be used, however, powders of activated alumina are preferable. Use amount of the refractory inorganic oxide is usually, 10 to 300 g, preferably 50 to 250 g per 1 litter of the one-piece structure. The use amount below 10 g is not capable of sufficiently dispersing noble metals and provides insufficient durability; while the use amount over 300 g increases pressure loss of exhaust gas, and thus not preferable.

Use amount of the noble metals is, as total of palladium and platinum, 0.3 to 20 g, preferably 0.5 to 10 g per 100 g of the refractory inorganic oxide.

Average particle diameter of the refractory inorganic oxide is 10 to 150 μm, preferably 30 to 80 μm; BET specific surface area thereof is 50 to 500 $m^2$/g, preferably 150 to 400 $m^2$/g.

Now, a preparation method for the catalyst will specifically be explained. For example, the refractory inorganic oxide particles are impregnated with an aqueous solution of a palladium salt, followed by drying and firing at 300° to 800° C., preferably at 400° to 600° C. for 300 to 800 hours, preferably for 30 minutes to 1 hour; thus obtained powders, an aqueous solution of a palladium salt, a refractory in organic oxide, and if necessary, zeolite powders are crushed in a wet process to prepare aqueous slurry; this slurry is coated onto 3-dimensional one-piece structure, and is then subjected to calcination at 300° to 800° C., preferably at 400° to 600° C. for 15 minutes to 2 hours, preferably for 30 minutes to 1 hour to yield the oxidation catalyst.

As zeolite used, if necessary, BEA type, MFI type, FER type, FAU type, MOR type or the like may be used, however, BEA type zeolite with a silica/alumina ratio of about 25 to 150 is preferable. This is used to aid combustion of hydrocarbon, and to purify HC, CO or the like in exhaust gas from an engine, in the case where a regeneration processing is not carried out. Use amount thereof is 5 to 100 g, preferably 10 to 50 g based on 100 g of the refractory inorganic oxide.

As the 3-dimensional one-piece structure covering the catalyst components, a heat resistant carrier such as a honeycomb carrier or the like is included, however, one-piece molded honeycomb structure is preferable, including for example, a monolithic honeycomb carrier, a metal honeycomb carrier, a plug honeycomb carrier or the like.

As the monolithic honeycomb carrier, any one usually referred to as a ceramic honeycomb carrier may be used, and in particular, cordierite, mullite, α-alumina, zirconia, titania, titanium phosphate, aluminium titanate, petalite, spondumene, alumino silicate, magnesium silicate are preferable; among these, a cordierite type is particularly preferable. Furthermore, one-piece structure using a heat resistant metal having oxidation resistance, such as stainless steel, a Fe—Cr—Ar alloy or the like is used.

These monolithic honeycomb carriers are produced by a method for extrusion molding or a firmly winding method for sheet-like elements or the like. The shape of a gas passage opening thereof (cell shape) may be any of hexagon, quadrangle, triangle or corrugation. A cell density (cell number/unit cross-sectional area) of 100 to 600 cells/in$^2$ is sufficient for use, and 200 to 500 cells/cm$^2$ is preferable.

In the present invention, a method for covering catalyst components is not especially limited, and usually, an impregnation method is suitably used.

As a particulate filter used in the present invention, there are various types, and known ones may be used, for example, a filter made of cordierite, a filter made of high heat resistant silicon carbide or the like.

EXAMPLES

Now, the present invention will be explained in further detail with reference to Examples and Comparative Examples, however, the present invention is by no means limited thereto.

Example 1

Into 25 g of activated alumina (γ-Al$_2$O$_3$ with a BET specific surface area of 150 m$^2$/g, and an average primary particle diameter of 75 μm), 1 ml of a deionized water solution (hereafter, deionized water was used in any of an aqueous solution) of palladium nitrate containing 0.2 g of palladium, an aqueous solution (a concentration of 14% by mass) were impregnated, followed by drying at 120° C. for 8 hours, and firing at 500° C. for 1 hour. Then, 25 g of the resultant powders, 42 ml of an aqueous solution of platinum nitrate containing 4.8 g of platinum, 70 g of activated alumina (γ-Al$_2$O$_3$ with a BET specific surface area of 300 m$^2$/g, and an average primary particle diameter of 75 μm), and 30 g of zeolite (BEA type, with silica/alumina ratio=25, an average particle diameter of 10.5 μm) were wet-milled by a ball mill, to prepare aqueous slurry. This slurry was wash-coated onto 1 liter of a honeycomb carrier made of cordierite, having 400 cells per in$^2$ of the cross-sectional area, followed by drying at 120° C. for 8 hours, and calcining at 500° C. for 1 hour to yield an oxidation catalyst (A).

Example 2

An oxidation catalyst (B) was obtained in the same way as Example 1, except that 4 ml of an aqueous solution of palladium nitrate containing 0.8 g of palladium was used instead of 1 ml of an aqueous solution of palladium nitrate containing 0.2 g of palladium, and 37.2 ml of an aqueous solution of platinum nitrate containing 4.2 g of platinum was used instead of 42 ml of an aqueous solution of platinum nitrate containing 4.8 g of platinum.

Example 3

An oxidation catalyst (C) was obtained in the same way as Example 1, except that 8.5 ml of an aqueous solution of palladium nitrate containing 1.7 g of palladium was used instead of 1 ml of an aqueous solution of palladium nitrate containing 0.2 g of palladium, and 29.2 ml of an aqueous solution of platinum nitrate containing 3.3 g of platinum was used instead of 42 ml of an aqueous solution of platinum nitrate containing 4.8 g of platinum.

Example 4

An oxidation catalyst (D) was obtained in the same way as Example 1, except that 12.5 ml of an aqueous solution of palladium nitrate containing 2.5 g of palladium was used instead of 1 ml of an aqueous solution of palladium nitrate containing 0.2 g of palladium, and 22.1 ml of an aqueous solution of platinum nitrate containing 2.5 g of platinum was used instead of 42 ml of an aqueous solution of platinum nitrate containing 4.8 g of platinum.

Example 5

An oxidation catalyst (E) was obtained in the same way as Example 1, except that 47.5 ml of an aqueous solution of palladium nitrate containing 9.5 g of palladium was used instead of 1 ml of an aqueous solution of palladium nitrate containing 0.2 g of palladium, and 4.4 ml of an aqueous solution of platinum nitrate containing 0.5 g of platinum was used instead of 42 ml of an aqueous solution of platinum nitrate containing 4.8 g of platinum.

Example 6

An oxidation catalyst (F) was obtained in the same way as Example 1, except that 8.5 ml of an aqueous solution of palladium nitrate containing 1.7 g of palladium was used instead of 1 ml of an aqueous solution of palladium nitrate containing 0.2 g of palladium, and 73.5 ml of an aqueous solution of platinum nitrate containing 8.3 g of platinum was used instead of 42 ml of an aqueous solution of platinum nitrate containing 4.8 g of platinum.

Example 7

An oxidation catalyst (G) was obtained in the same way as Example 1, except that 16.5 ml of an aqueous solution of palladium nitrate containing 3.3 g of palladium was used instead of 1 ml of an aqueous solution of palladium nitrate containing 0.2 g of palladium, and 59.3 ml of an aqueous solution of platinum nitrate containing 6.7 g of platinum was used instead of 42 ml of an aqueous solution of platinum nitrate containing 4.8 g of platinum.

Example 8

An oxidation catalyst (H) was obtained in the same way as Example 1, except that 25 ml of an aqueous solution of palladium nitrate containing 5.0 g of palladium was used instead of 1 ml of an aqueous solution of palladium nitrate containing 0.1 g of palladium, and 44.2 ml of an aqueous solution of platinum nitrate containing 5.0 g of platinum was used instead of 42 ml of an aqueous solution of platinum nitrate containing 4.8 g of platinum.

Example 9

An oxidation catalyst (I) was obtained in the same way as Example 1, except that 0.5 ml of an aqueous solution of palladium nitrate containing 0.1 g of palladium was used instead of 1 ml of an aqueous solution of palladium nitrate containing 0.2 g of palladium, and 16.8 ml of an aqueous solution of platinum nitrate containing 1.9 g of platinum was used instead of 42 ml of an aqueous solution of platinum nitrate containing 4.8 g of platinum.

Example 10

An oxidation catalyst (J) was obtained in the same way as Example 1, except that 1.5 ml of an aqueous solution of palladium nitrate containing 0.3 g of palladium was used instead of 1 ml of an aqueous solution of palladium nitrate containing 0.2 g of palladium, and 15 ml of an aqueous solution of platinum nitrate containing 1.7 g of platinum was used instead of 42 ml of an aqueous solution of platinum nitrate containing 4.8 g of platinum.

Example 11

An oxidation catalyst (K) was obtained in the same way as Example 1, except that 3.5 ml of an aqueous solution of palladium nitrate containing 0.7 g of palladium was used instead of 1 ml of an aqueous solution of palladium nitrate containing 0.2 g of palladium, and 11.5 ml of an aqueous solution of platinum nitrate containing 1.3 g of platinum was used instead of 42 ml of an aqueous solution of platinum nitrate containing 4.8 g of platinum.

Example 12

An oxidation catalyst (L) was obtained in the same way as Example 1, except that 5 ml of an aqueous solution of palladium nitrate containing 1.0 g of palladium was used instead of 1 ml of an aqueous solution of palladium nitrate containing 0.2 g of palladium, and 8.8 ml of an aqueous solution of platinum nitrate containing 1.0 g of platinum was used instead of 42 ml of an aqueous solution of platinum nitrate containing 4.8 g of platinum.

Comparative Example 1

A comparative oxidation catalyst (A) was obtained in the same way as Example 1, except that 44.2 ml of an aqueous solution of platinum nitrate containing 5.0 g of platinum was used without using palladium nitrate, and without using palladium in catalyst slurry.

Comparative Example 2

A comparative oxidation catalyst (B) was obtained in the same way as Example 1, except that 44 ml of an aqueous solution of platinum nitrate containing 4.8 g of platinum was used without using palladium nitrate, and without using palladium in catalyst slurry.

Comparative Example 3

A comparative oxidation catalyst (C) was obtained in the same way as Example 1, except that 42 ml of an aqueous solution of platinum nitrate containing 4.8 g of platinum was used without using palladium nitrate, and without using palladium in catalyst slurry.

Example 13

Evaluation of the Catalysts

The catalyst prepared in the Examples and Comparative Examples were subjected to firing at 800° C. for 16 hours.

In a purification apparatus for exhaust gas shown in the drawing, it was confirmed in advance that about 3 g/liter of particulates was caught, in 6 hours of operation under set conditions of a rotation speed of a 3.2 liter engine equipped with DI/TC/IC/EGR of 2000 rpm, a torque of 95 N-m, and the setting of the temperature sensor 7 at the front of the catalyst zone 5 of 250° C. Subsequently, each of the oxidation catalysts (A) to (L) and the comparative oxidation catalysts (A) to (C), prepared in Examples 1 to 12, and Comparative Examples 1 to 3, respectively, was filled as an oxidation catalyst; on the other hand, as a particulate filter, a filter made of cordierite, with a diameter of 143.8 mm, a length of 152.4 mm, a cell number per 1 in$^2$ of 300, and a volume of 2.5 L, was used. The engine was operated for 6 hours under the above described conditions. Then, temperature of exhaust gas flowing into the oxidation catalyst was set at 300° C., and light oil in an amount corresponding to temperature of 1.7% (converted to $C_1$) of hydrocarbon at the upstream side of the oxidation catalyst was supplied from a fuel supply pump through a fuel supply nozzle. Temperature at the catalyst exit prepared by the Example, after 20 minutes from start of fuel supply, was measured.

Then, after completion of 20 minutes of fuel supply, weight of the cooled filter was measured, and the result on checking whether or not caught particulates were combusted, based on weight reduction amount, is shown in Table 1. In Table 1, mark ○ represents decrease in weight of soot caught and equal to weight before catching, while mark X represents increase in weight compared with weight before catching.

TABLE 1

|  |  | Sample Amount (g/L) | | Pt/pd Ratio | Temperature at exit of oxidation zone (° C.) | Combustion of particulate |
| --- | --- | --- | --- | --- | --- | --- |
|  |  | Pt | Pd | | | |
| Example 1 | Cat. (A) | 4.8 | 0.2 | 20/1 | 611 | ○ |
| Example 2 | Cat. (B) | 4.2 | 0.8 | 5/1 | 620 | ○ |
| Example 3 | Cat. (C) | 3.3 | 1.7 | 2/1 | 623 | ○ |
| Example 4 | Cat. (D) | 2.5 | 2.5 | 1/1 | 615 | ○ |
| Example 5 | Cat. (E) | 9.5 | 0.5 | 20/1 | 633 | ○ |
| Example 6 | Cat. (F) | 8.3 | 1.7 | 5/1 | 638 | ○ |
| Example 7 | Cat. (G) | 6.7 | 3.3 | 2/1 | 637 | ○ |
| Example 8 | Cat. (H) | 5.0 | 5.0 | 1/1 | 631 | ○ |
| Example 9 | Cat. (I) | 1.9 | 0.1 | 20/1 | 602 | ○ |
| Example 10 | Cat. (J) | 1.7 | 0.3 | 5/1 | 610 | ○ |
| Example 11 | Cat. (K) | 1.3 | 0.7 | 2/1 | 608 | ○ |
| Example 12 | Cat. (L) | 1.0 | 1.0 | 1/1 | 604 | ○ |
| Comp. Exmp. 1 | Comp. Cat. (A) | 5.0 | 0.0 | 1/0 | 305 | X |
| Comp. Exmp. 2 | Comp. Cat. (B) | 10.0 | 0.0 | 1/0 | 302 | X |
| Comp. Exmp. 3 | Comp. Cat. (C) | 2.0 | 0.0 | 1/0 | 301 | X |

(Note)
Comp. Exmp.: Comparative Example,
Cat.: Catalyst,
Comp. Cat.: Comparative Catalyst

The invention claimed is:

1. A purification method for exhaust gas from an internal combustion engine, wherein said purification method uses an exhaust gas purification apparatus comprising an oxidation zone installed with an oxidation catalyst supporting both platinum and palladium, and a filtering zone installed with a particulate filter, along exhaust gas flow at the exhaust gas passage of an internal combustion engine, characterized in that hydrocarbon-based liquid is supplied to the inflow side of the exhaust gas of said oxidation zone at the time when 2 to 10 g of particulates per 1 liter of said particulate filter are caught, to raise temperature of said exhaust gas up to equal to or higher than 550° C. by said oxidation catalyst so as to make the residue of said particulate filter combusted, wherein said oxidation catalyst comprises refractory inorganic oxide powders containing platinum and palladium, coated on a 3-dimensional monolithic refractory structure, a mass ratio of platinum/palladium being 20/1 to 1/1, a total amount of palladium and platinum being 0.3 to 20 g per 100 g of the refractory inorganic oxide, and said refractory inorganic oxide being at least one selected from the group consisting of alumina, silica-containing alumina, zirconia and titania.

2. The method according to claim 1, wherein said oxidation catalyst is one capable of raising temperature of the residue of said particulate filter to as high as equal to or higher than 550° C. and combusting, by supplying of said hydrocarbon-based liquid, even when it is exposed to a high temperature of equal to or higher than 800° C.

3. The method according to claim 2, wherein said internal combustion engine is a diesel engine.

4. The method according to claim 1, wherein said internal combustion engine is a diesel engine.

5. The method according to claim 1, wherein said oxidation catalyst further comprises 5-100 g of zeolite per 100 g of the refractory inorganic oxide.

6. A purification apparatus for exhaust gas from an internal combustion engine, wherein said purification apparatus is an exhaust gas purification apparatus comprising an oxidation zone installed with an oxidation catalyst supporting both platinum and palladium, and a filtering zone installed with a particulate filter, along exhaust gas flow at the exhaust gas passage of an internal combustion engine, and is installed with a liquid supply port of hydrocarbon liquid, so that hydrocarbon-based liquid is supplied to the inflow side of the exhaust gas of said oxidation zone at the time when 2 to 10 g of particulates per 1 liter of said particulate filter are captured to raise temperature of said exhaust gas up to equal to or higher than 550° C. by said oxidation catalyst so as to make the residue of said particulate filter combusted, wherein said oxidation catalyst comprises refractory inorganic oxide powders containing platinum and palladium, coated on a 3-dimensional monolithic refractory structure, a mass ratio of platinum/palladium being 20/1 to 1/1, a total amount of palladium and platinum being 0.3 to 20 g per 100 g of the refractory inorganic oxide, and said refractory inorganic oxide being at least one selected from the group consisting of alumina, silica-containing alumina, zirconia and titania.

7. The apparatus according to claim 6, wherein said internal combustion engine is a diesel engine.

8. The apparatus according to claim 6, wherein said oxidation catalyst further comprises 5-100 g of zeolite per 100 g of the refractory inorganic oxide.

* * * * *